(12) United States Patent
Erdemir et al.

(10) Patent No.: US 11,015,140 B2
(45) Date of Patent: May 25, 2021

(54) CATALYTICALLY ACTIVE LUBRICANTS

(71) Applicant: UCHICAGO ARGONNE, LLC, Chicago, IL (US)

(72) Inventors: Ali Erdemir, Naperville, IL (US); Massimiliano Delferro, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 126 days.

(21) Appl. No.: 15/939,479

(22) Filed: Mar. 29, 2018

(65) Prior Publication Data

US 2018/0282656 A1 Oct. 4, 2018

Related U.S. Application Data

(60) Provisional application No. 62/479,722, filed on Mar. 31, 2017.

(51) Int. Cl.
| | |
|---|---|
| *C10M 169/04* | (2006.01) |
| *C10M 155/00* | (2006.01) |
| *C10M 107/02* | (2006.01) |
| *C10M 139/00* | (2006.01) |
| B01J 31/16 | (2006.01) |
| B01J 31/06 | (2006.01) |
| C10N 10/02 | (2006.01) |
| C10N 10/04 | (2006.01) |
| C10N 10/08 | (2006.01) |
| C10N 10/12 | (2006.01) |
| C10N 10/14 | (2006.01) |
| C10N 40/25 | (2006.01) |

(52) U.S. Cl.
CPC ...... *C10M 169/041* (2013.01); *C10M 107/02* (2013.01); *C10M 139/00* (2013.01); *C10M 155/00* (2013.01); *B01J 31/06* (2013.01); *B01J 31/1691* (2013.01); *C10M 2227/09* (2013.01); C10N 2010/02 (2013.01); C10N 2010/04 (2013.01); C10N 2010/08 (2013.01); C10N 2010/12 (2013.01); C10N 2010/14 (2013.01); C10N 2040/25 (2013.01)

(58) Field of Classification Search
CPC .. B01J 31/1691; B01J 31/06; C10M 2227/09; C10N 2240/10; C10N 2210/08; C10N 2210/01; C10N 2210/02; C10N 2210/04; C10N 2210/06; C10N 2210/07; C10N 2010/02; C10N 2010/04; C10N 2010/06; C10N 2010/08; C10N 2010/10; C10N 2010/12; C10N 2010/14
See application file for complete search history.

(56) References Cited

U.S. PATENT DOCUMENTS

| 9,255,238 B2 | 2/2016 | Erdemir et al. | |
|---|---|---|---|
| 2002/0032289 A1* | 3/2002 | Wang | B01J 31/1805 526/171 |
| 2016/0340602 A1 | 11/2016 | Erdemir et al. | |
| 2017/0073612 A1* | 3/2017 | Thiebaut | C10M 141/12 |

FOREIGN PATENT DOCUMENTS

CN 105219495 A * 1/2016

OTHER PUBLICATIONS

Pangborn et al., Safe and Convenient Procedure for Solvent Purification, Organometallics, 1595):1518-20 (1996).

* cited by examiner

*Primary Examiner* — Vishal V Vasisth
(74) *Attorney, Agent, or Firm* — Marshall, Gerstein & Borun LLP

(57) ABSTRACT

Provided herein are lubricant compositions and methods of using the same. These lubricant compositions are useful for providing improved anti-friction and anti-wear properties.

18 Claims, No Drawings

CATALYTICALLY ACTIVE LUBRICANTS

This application claims benefit of 62/479,722 filed Mar. 31, 2017.

STATEMENT OF GOVERNMENT SUPPORT

The United States Government has rights in this invention pursuant to Contract No. DE-AC02-06CH11357 between the United States Government and UChicago Argonne, LLC representing Argonne National Laboratory.

BACKGROUND

Lubricating oils such as, for example, engine oils and greases typically include conventional additives to enhance lubrication properties. Conventional additives such as, for example, the ZDDP and MoTDC, can be detrimental to effective operation of catalytic converters and other after-treatment devices for engines which use lubricants containing such additives. This results in ineffective and incomplete operation of such devices leading to increase in environmental pollution. While solid lubricants can be deposited on surfaces of components requiring lubrication (e.g., engine components such as piston-cylinder of an IC engine, transmission gears, tie-rod assembly, etc.), deposition of such solid lubricants can be expensive, cumbersome and difficult to scale-up to integrate with large scale manufacturing operations. There is a need for lubricants with enhanced anti-friction and anti-wear properties.

SUMMARY

Provided herein are lubricant compositions comprising (i) an oil comprising a plurality of hydrocarbon polymers, and (ii) a metal catalyst, wherein at least one hydrocarbon polymer comprises a coordinating moiety for the metal catalyst ("coordinating hydrocarbon polymer").

In various cases, at least one hydrocarbon polymer, the coordinating hydrocarbon polymer, or both comprise a poly-alpha-olefin. In various embodiments, the coordinating hydrocarbon polymer comprises the poly-alpha-olefin.

In various embodiments, the poly-alpha-olefin comprises a copolymer of a first alpha-olefin monomer and a second alpha-olefin monomer. In some embodiments, the poly-alpha-olefin further comprises an ethylene monomer.

In some embodiments, the first alpha-olefin monomer is an alpha-$C_{3-24}$olefin. In some cases, the second alpha-olefin monomer is an alpha-$C_{3-24}$olefin. In some embodiments, the first alpha-olefin monomer comprises the coordinating moiety. In some cases, the second alpha-olefin monomer comprises the coordinating moiety.

In various embodiments, the coordinating moiety comprises —$NR_2$, —$NRCH_2CH_2NR_2$, —OR, or —COOR, and each R independently is H, $C_{1-6}$alkyl, or aryl. In various cases, the coordinating moiety is present in the coordinating hydrocarbon polymer in an amount of about 1 mol % to about 10 mol %.

In some embodiments, the coordinating hydrocarbon polymer has a structure of formula (I)

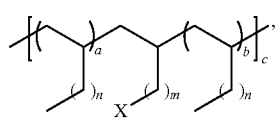

(I)

wherein each of a and b independently is 1, 2, 3, 4, 5, 6, 7, 8, 9, or 10; c is 1 to 20; each n is the same and is 0 to 21; m is 0 to 21; X is —$NR_2$, —$NRCH_2CH_2NR_2$, —OR, or —COOR; and each R independently is H, $C_{1-6}$alkyl, or aryl. In some embodiments, at least one of n and m is 5.

In some embodiments, the coordinating hydrocarbon polymer has a structure of formula (II)

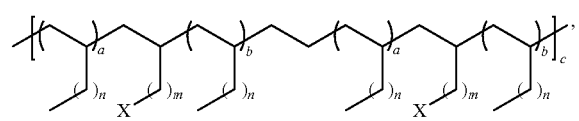

(II)

wherein each of a and b independently is 1, 2, 3, 4, 5, 6, 7, 8, 9, or 10; c is 1 to 20; each n is the same and is 0 to 21; each m is the same and is 0 to 21; each X independently is —$NR_2$, —$NRCH_2CH_2NR_2$, —OR, or —COOR; and each R independently is H, $C_{1-6}$alkyl, or aryl.

In some embodiments, the metal catalyst is Sc, Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt, Au, or a combination thereof. In some embodiments, the metal catalyst is Cu, Co, Ni, Au, Pt, Pd, or Ag. In various cases, the metal catalyst is present in the composition in the amount of 0.001 to 10% by weight. In some cases, the metal catalyst is present in the composition in the amount of 0.001 to 1% by weight.

The disclosure also provides a method of lubricating moving, contacting surfaces comprising the step of applying between the contacting surfaces with any of the lubricant compositions disclosed herein. In some cases, the surfaces comprise iron, aluminum, magnesium, steel, superalloy, ceramics and their coatings, graphite, carbon coating, fiber, or a composite thereof.

DETAILED DESCRIPTION

Provided herein are lubricant compositions and methods of using the same. The compositions disclosed herein comprise (i) an oil comprising a plurality of hydrocarbon polymers, and (ii) a metal catalyst, wherein at least one hydrocarbon polymer comprises a coordinating moiety for the metal catalyst ("coordinating hydrocarbon polymer"). These compositions are useful as lubricants, and, due to the presence of the metal catalyst, can fragment the hydrocarbon polymers into smaller chains (e.g., dimers and trimers) under the influence of mechanical and/or thermal loading to form, e.g., a boundary film deposited on a surface near the lubricant composition. The boundary film can provide a robust and long-lasting lubricant layer on the surface. The lubricant compositions and methods of using the same can thereby increase lubricity, lubricant durability, lower costs and eliminate harmful additives causing excess waste and pollution.

The use of the terms "a," "an," "the," and similar referents in the context of describing the invention (especially in the context of the claims) are to be construed to cover both the singular and the plural, unless otherwise indicated. Recitation of ranges of values herein merely are intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended to better illustrate the invention and is not a limitation on the scope of the invention unless otherwise claimed. No language in the specification should be construed as indicating any non-claimed element as essential to the practice of the invention. As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

As used herein, the term "alkyl" refers to straight chained and branched hydrocarbon groups, including but not limited to, methyl, ethyl, n-propyl, i-propyl, n-butyl, sec-butyl, t-butyl, n-pentyl, 2-methylbutyl, 3-methylbutyl, 2,2-dimethylpropyl, n-hexyl, 2-methylpentyl, 3-methylpentyl, 4-methylpentyl, 2,2-dimethylbutyl, 2,3-dimethylbutyl, 3,3-dimethylbutyl, and 2-ethybutyl. The term $C_{m-n}$ means the alkyl group has "m" to "n" carbon atoms.

As used herein, the term "aryl" refers to a monocyclic or polycyclic aromatic group, preferably a $C_{6-10}$ monocyclic or bicyclic aromatic group. Examples of aryl groups include, but are not limited to, phenyl, naphthyl, fluorenyl, azulenyl, anthryl, phenanthryl, pyrenyl, biphenyl, and terphenyl. Aryl also refers to bicyclic and tricyclic carbon rings, where one ring is aromatic and the others are saturated, partially unsaturated, or aromatic, for example, dihydronaphthyl, indenyl, indanyl, or tetrahydronaphthyl (tetralinyl). Unless otherwise indicated, an aryl group can be unsubstituted or substituted with one or more, and in particular one to four, groups independently selected from, for example, halo, alkyl, haloalkyl, alkenyl, —OCF$_3$, —NO$_2$, —CN, —NC, —OH, —Oalkyl, —NH$_2$, NH(alkyl), —CO$_2$H, —C(O)alkyl, —CO$_2$alkyl, —OCOalkyl, —NHC(O)alkyl, —NHC(O)NHalkyl, —SO$_2$alkyl, aryl, heteroaryl, cycloalkyl, and heterocycloalkyl.

Lubricant Compositions

The lubricant compositions disclosed herein comprise a plurality of hydrocarbon polymers, a coordinating hydrocarbon polymer, and a metal catalyst. The coordinating hydrocarbon polymer comprises a coordinating moiety that can coordinate to the metal catalyst. Benefits of the disclosed lubricant composition include, for example: (1) providing a simple method of mixing a small quantity of a metal catalyst in an oil (e.g., hydrocarbon polymers) to form a high quality lubricant; (2) enabling fragmenting of hydrocarbon polymers into dimers and trimers such that a boundary film of carbon-based dimers and trimers is deposited on a surface on which the lubricant is disposed under the influence of mechanical and/or thermal loading such as when the surface is sliding or rubbing against another surface; (3) providing robust and long lasting lubrication with a lower coefficient of friction relative to conventional lubricants; and (4) allowing relatively facile and low cost manufacturing as well as easy integration with existing systems.

As used herein, the term "hydrocarbon polymer" includes any suitable hydrocarbon polymer (alternatively referred to as an "oil"). The oil can include a paraffinic oil, a naphthenic oil or an aromatic oil. The oil can include a petroleum based oil or otherwise a mineral oil. The oil can include a vegetable oil or a synthetic oil such as a hydrogenated poly-alpha-olefin ("PAO") oil, an ester based oil, a silicone based oil, plant or vegetable oils, polyalkylene glycols or a fluorocarbon based oil. Any one of a Group I oil, a Group II oil, a Group III oil, a Group IV oil or a Group V oil as defined by the American Petroleum Institute (API) can be used. In particular, the oil can include a PAO oil.

The oil can include fully formulated oils. As used herein, the term "fully formulated" refers to oils that include any pre-prepared oil formulation which can be used as is. Such fully formulated oils can include, for example commercially available natural, semi-synthetic or synthetic oils (e.g., commercially available oils such as MOBIL1®, CASTROL® series oils, CASTROL GTX® series oils, VALVOLINE® series oils, VALVOLINE SYNPOWER® oil, PENNZOIL® series oils; YAMAHA® series oils, NULON® series oils, HAVOLINE® series oils, or any other commercially available fully formulated oil). In embodiments where the lubricant composition is a fully formulated oil, the coordinating hydrocarbon polymer is added to the fully formulated oil along with the metal catalyst to provide the lubricant composition as disclosed herein. The metal catalyst and the coordinating hydrocarbon polymer can be mixed prior to addition to the fully formulated oil, or each of the metal catalyst and the coordinating hydrocarbon polymer can be added separately to the fully formulated oil.

In various embodiments, the hydrocarbon polymer, the coordinating hydrocarbon polymer, or both comprises a PAO. The PAO can comprise a copolymer of a first alpha-olefin monomer and a second alpha-olefin monomer. In some embodiments, the poly-alpha-olefin further comprises an ethylene monomer. In some embodiments, the first alpha-olefin monomer is an alpha-$C_{3-24}$olefin. In some embodiments, the second alpha-olefin monomer is an alpha-$C_{3-24}$olefin. The lubricant compositions as disclosed herein can comprise two or more different coordinating hydrocarbon polymers. In embodiments where the coordinating hydrocarbon polymer comprises a poly-alpha-olefin, the coordinating moiety can be present in the first alpha-olefin monomer or the second alpha-olefin monomer.

The coordinating hydrocarbon polymer comprises a coordinating moiety. As used herein, "coordinating moiety" refers to a functional group (e.g., amine, alcohol, carboxylate) that can form any type of bond to a metal catalyst (e.g., covalent, dative, ionic). In some embodiments, the coordinating moiety forms a dative bond to the metal catalyst. Specifically contemplated coordinating moieties include —NR$_2$, —NRCH$_2$CH$_2$NR$_2$, —OR, and —COOR, and each R independently is H, $C_{1-6}$alkyl, or aryl. For example, R can be H, methyl, ethyl, n-propyl, i-propyl, n-butyl, sec-butyl, t-butyl, n-pentyl, 2-methylbutyl, 3-methylbutyl, 2,2-dimethylpropyl, n-hexyl, 2-methylpentyl, 3-methylpentyl, 4-methylpentyl, 2,2-dimethylbutyl, 2,3-dimethylbutyl, 3,3-dimethylbutyl, 2-ethybutyl, phenyl, naphthyl, fluorenyl, azulenyl, anthryl, phenanthryl, pyrenyl, biphenyl, terphenyl, dihydronaphthyl, indenyl, indanyl, or tetrahydronaphthyl. In some cases, X can be —NH$_2$, —NHCH$_2$CH$_2$NH$_2$, —OH, or —COOH. The coordinating hydrocarbon polymer can comprise two or more (e.g., 2, 3, or 4) different coordinating moieties (e.g., different coordinating moieties on different monomers of the polymer).

The coordinating moiety can be present in the coordinating hydrocarbon polymer in an amount of about 1 mol % to about 10 mol %. As used herein, mol % of the coordinating moiety in the coordinating hydrocarbon polymer refers to the number of coordinating moieties present in a single hydrocarbon polymer molecule. For example, a 1 mol % corresponds to 1% of the hydrocarbon polymer having a coordinating moiety. Specifically contemplated mol % of the coordinating moiety in the coordinating hydrocarbon polymer include 1 mol %, 1.5 mol %, 2 mol %, 2.5 mol %, 3 mol %, 3.5 mol %, 4 mol %, 4.5 mol %, 5 mol %, 5.5 mol %, 6 mol %, 6.5 mol %, 7 mol %, 7.5 mol %, 8 mol %, 8.5 mol %, 9 mol %, 9.5 mol %, and 10 mol %.

In addition, the coordinating hydrocarbon polymer can be present in the lubricating composition in an amount of 1 wt % to 50 wt %. Specifically contemplated amounts of the coordinating hydrocarbon polymer include 1 wt % to 40 wt %, 1 wt % to 35 wt %, 1 wt % to 30 wt %, 1 wt % to 25 wt %, 1 wt % to 20 wt %, 1 wt % to 15 wt %, 1 wt % to 10 wt %, 5 wt % to 10 wt %, 5 wt % to 15 wt %, 5 wt % to 20 wt %, 5 wt % to 25 wt %, 5 wt % to 30 wt %, 5 wt % to 35 wt %, and 5 wt % to 40 wt %.

The coordinating hydrocarbon polymer can have a structure of formula (I)

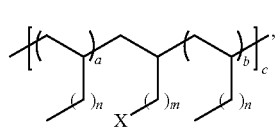

(I)

wherein each of a and b independently is 1, 2, 3, 4, 5, 6, 7, 8, 9, or 10; c is 1 to 20; each n is the same and is 0 to 17; m is 0 to 21; X is —$NR_2$, —$NRCH_2CH_2NR_2$, —OR, or —COOR; and each R independently is H, $C_{1-6}$alkyl, or aryl. For example, R can be H, methyl, ethyl, n-propyl, i-propyl, n-butyl, sec-butyl, t-butyl, n-pentyl, 2-methylbutyl, 3-methylbutyl, 2,2-dimethylpropyl, n-hexyl, 2-methylpentyl, 3-methylpentyl, 4-methylpentyl, 2,2-dimethylbutyl, 2,3-dimethylbutyl, 3,3-dimethylbutyl, 2-ethybutyl, phenyl, naphthyl, fluorenyl, azulenyl, anthryl, phenanthryl, pyrenyl, biphenyl, terphenyl, dihydronaphthyl, indenyl, indanyl, or tetrahydronaphthyl. In some cases, X can be —$NH_2$, —$NHCH_2CH_2NH_2$, —OH, or —COOH. In some embodiments, at least one of n and m is 5.

The coordinating hydrocarbon polymer can have a structure of formula (II)

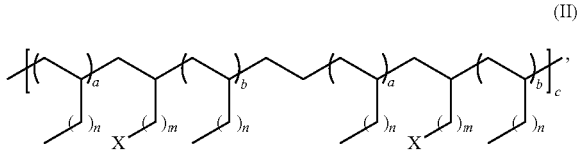

(II)

wherein each of a and b independently is 1, 2, 3, 4, 5, 6, 7, 8, 9, or 10; c is 1 to 20; each n is the same and is 0 to 21; each m is the same and is 0 to 21; and each X independently is —$NR_2$, —$NRCH_2CH_2NR_2$, —OR, or —COOR; and each R independently is H, $C_{1-6}$alkyl, or aryl. For example, R can be H, methyl, ethyl, n-propyl, i-propyl, n-butyl, sec-butyl, t-butyl, n-pentyl, 2-methylbutyl, 3-methylbutyl, 2,2-dimethylpropyl, n-hexyl, 2-methylpentyl, 3-methylpentyl, 4-methylpentyl, 2,2-dimethylbutyl, 2,3-dimethylbutyl, 3,3-dimethylbutyl, 2-ethybutyl, phenyl, naphthyl, fluorenyl, azulenyl, anthryl, phenanthryl, pyrenyl, biphenyl, terphenyl, dihydronaphthyl, indenyl, indanyl, or tetrahydronaphthyl. In some cases, X can be —$NH_2$, —$NHCH_2CH_2NH_2$, —OH, or —COOH. In some embodiments, at least one of n and m is 5.

The lubricant compositions include a metal catalyst. The lubricant composition can comprise two or more (e.g., 2, 3, or 4) metal catalysts. Suitable metal catalysts include Sc, Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt, Au, or a combination thereof. In some embodiments, the metal catalyst is Cu, Co, Ni, Au, Pt, Pd, or Ag. In various cases, the metal catalyst is Cu. The impact that the various metal catalysts described herein have on the friction co-efficient of the surfaces on which a lubricant composition comprising the various metal catalysts described herein are disposed, can be a function of the inherent catalytic activity of the particular metal catalyst.

In various embodiments, the metal catalyst is present in the composition in the amount of 0.001 to 10 wt %. In various embodiments, the metal catalyst is present in the composition in the amount of 0.001 to 1 wt % (e.g., 0.001%, 0.005%, 0.01%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, or 1.0%).

Preparation of Lubricant Compositions

The lubricant compositions as disclosed herein can be prepared via any convenient route. For example, all components can be mixed together in a single step. Alternatively, select components can be mixed together, and other components added subsequently. For example, the metal catalyst and the coordinating hydrocarbon polymer can be mixed together prior to addition to the rest of the hydrocarbon polymers (e.g., the oil). The coordinating hydrocarbon polymer and the rest of the hydrocarbon polymers (e.g., the oil) can be mixed and the metal catalyst then added.

The mixture of the components can be shaken, stirred, sonicated (e.g., subjected to ultrasonication), whirled and/or mixed using any other mixing method. The mixing can also promote fragmenting of the long-hydrocarbon chains of the oil by the metal catalyst into carbon dimers and/or trimers as described above. The carbon particles and/or metal particles (e.g. pure metal, metal oxide, metal nitride, metal carbide or metal sulfide) can be homogenously distributed in the lubricant composition such that when the lubricant composition is disposed on a surface, a carbon-based film, a metal-based film or a combination thereof is formed on the surface.

Methods of Use

The lubricant compositions disclosed herein can be used as a lubricant in any system, device or apparatus that includes mutually contiguous surfaces which displace (e.g., slide) relative to one another. The disclosure also provides a method of lubricating moving, contacting surfaces comprising the step of applying between the contacting surfaces with any of the lubricant compositions disclosed herein. In some embodiments, the surfaces comprise iron, aluminum, magnesium, steel, superalloy, ceramics and their coatings, graphite, carbon coating, fiber, or a composite thereof.

The metal catalyst fragments the hydrocarbon polymers of the oil into carbon based dimers and/or trimers or otherwise carbon particles, which are deposited on a surface on which the lubricant is disposed. Furthermore, a thin layer of the metal or otherwise a metal oxide, metal halide, metal nitride, metal carbide or metal sulfide included in the metal-organic compound can also be deposited on the surface. In this manner, a carbon-based and/or metal-based boundary film is disposed on the surface which provides a robust and long-lasting lubrication on the surface in addition to oil included in the lubricant composition.

The lubricant composition can be formulated to fragment the long-chain hydrocarbons of the oil into dimers and trimers under the influence of mechanical and/or thermal loading. For example, the mechanical loading at which the metal catalyst fragments the long-chain hydrocarbons can be in the range of 20 MPa to 5 GPa (e.g., 20 MPa, 40 MPa, 60

MPa, 80 MPa, 100 MPa, 200 MPa, 300 MPa, 400 MPa, 500 MPa, 600 MPa, 700 MPa, 800 MPa, 900 MPa, 1 GPa, 2 GPa, 3 GPa, 4 GPa or 5 GPa inclusive of all ranges and values there between). Furthermore, the thermal loading or temperature at which the metal catalyst fragments the long-chain hydrocarbons can be in the range of 20 degrees Celsius to 300 degrees Celsius (e.g., 20, 30, 40, 50, 60, 70, 80, 90, 100, 120, 140, 160, 180, 200, 220, 240, 260, 280 or 300 degrees Celsius inclusive of all ranges and values there between).

The invention will be more fully understood by reference to the following examples which detail exemplary embodiments of the invention. They should not, however, be construed as limiting the scope of the invention. All citations throughout the disclosure are hereby expressly incorporated by reference.

EXAMPLES

Materials: The catalyst rac-dimethylsilylbis(2-methylindenyl)zirconium dichloride [Me$_2$Si(2-MeInd)$_2$ZrCl$_2$] was obtained from Strem Chemicals (Newburyport, Mass., USA). Methylaluminoxane (MAO, obtained as a 10% toluene solution) was purchased from Sigma-Aldrich and used as received. Hydrocarbon solvents (n-pentane and toluene) were dried using activated alumina columns using the Grubbs method (Pangborn, A. B.; Giardello, M. A.; Grubbs, R. H.; Rosen, R. K.; Timmers, F. J. Organometallics 1996, 15, 1518-1520). α-olefin (1-hexene, 1-octene, 1-dodecene) were purchased from Sigma-Aldrich and were stored over Na/benzophenone ketyl in vacuo and vacuum transferred immediately prior to use. Comonomers were prepared accordingly to the literature. All the crude products were purified by vacuum distillation and stored under molecular sieves.

Polymerization: In a typical experiment, a 350 mL glass pressure vessel (dried in a 120° C. oven overnight prior to use) equipped with a magnetically driven stirrer was evacuated and flushed with nitrogen several times before the addition of toluene, MAO solution, α-olefin and the desired comonomer. The polymerization was then initiated by the addition of the toluene solution in which the catalyst was dissolved. The polymerization temperature was kept constant during the reaction. After 10 to 60 min, the reaction was stopped, and the polymer was precipitated with a dilute HCl solution in ethanol. The product was isolated by filtering, and washed with ethanol and acetone. Amines were liberated from their hydrochlorides by stirring the copolymers overnight in a 1.0 mol/l NaOH/ethanol solution. Finally the polymers were dried in vacuum at 50° C.

Metal nanoparticles were prepared in the presence of the polymer by employing following method: the polymer was suspended in aqueous 0.1 M metal salt solution (metal=Cu, Co, Ni, Au, Pt, Pd, or Ag) for the adsorption and loading of the metal ions. The mixture was stirred for 2 h to saturate the adsorption sites. It was then gently washed with DI water and then introduced into 100 mL of NaBH$_4$ aqueous solution (0.1 M) and kept for 4 h to completely reduce the M+ ions to M nanoparticles. After this step, the metal nanoparticle loaded polymer (M@lubricant) was washed with DI water and stored.

What is claimed:

1. A lubricant composition comprising (i) an oil comprising a plurality of hydrocarbon polymers, and (ii) nanoparticles consisting of metal, wherein at least one hydrocarbon polymer comprises a coordinating moiety that is coordinated to the metal nanoparticle ("coordinating hydrocarbon polymer");
   wherein the coordinating moiety comprises —NR$_2$, —NRCH$_2$CH$_2$NR$_2$, —OR, or —COOR, and each R independently is H, C$_{1-6}$alkyl, or aryl; and
   wherein the nanoparticles are present in the lubricant composition in an amount of 0.001 wt % to 1 wt %.

2. The lubricant composition of claim 1, wherein at least one hydrocarbon polymer, the coordinating hydrocarbon polymer, or both comprise a poly-alpha-olefin.

3. The lubricant composition of claim 2, wherein the poly-alpha-olefin comprises a copolymer of a first alpha-olefin monomer and a second alpha-olefin monomer.

4. The lubricant composition of claim 3, wherein the first alpha-olefin monomer is an alpha-C$_{3-24}$olefin.

5. The lubricant composition of claim 4, wherein the second alpha-olefin monomer is an alpha-C$_{3-24}$olefin.

6. The lubricant composition of claim 2, wherein the coordinating hydrocarbon polymer comprises the poly-alpha-olefin.

7. The lubricant composition of claim 6, wherein the first alpha-olefin monomer comprises the coordinating moiety.

8. The lubricant composition of claim 6, wherein the second alpha-olefin monomer comprises the coordinating moiety.

9. The lubricant composition of claim 1, wherein the coordinating moiety is present in the coordinating hydrocarbon polymer in an amount of about 1 mol % to about 10 mol %.

10. The lubricant composition of claim 1, wherein the coordinating hydrocarbon polymer has a structure of formula (I)

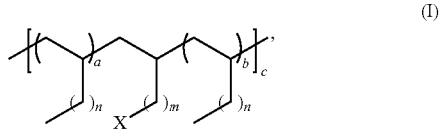

(I)

wherein
each of a and b independently is 1, 2, 3, 4, 5, 6, 7, 8, 9, or 10;
c is 1 to 20;
each n is the same and is 0 to 21;
m is 0 to 21;
X is —NR$_2$, —NRCH$_2$CH$_2$NR$_2$, —OR, or —COOR; and
each R independently is H, C$_{1-6}$alkyl, or aryl.

11. The lubricant composition of claim 10, wherein at least one of n and m is 5.

12. The lubricant composition of claim 3, wherein the poly-alpha-olefin further comprises an ethylene monomer.

13. The lubricant composition of claim 12, wherein the coordinating hydrocarbon polymer has a structure of formula (II)

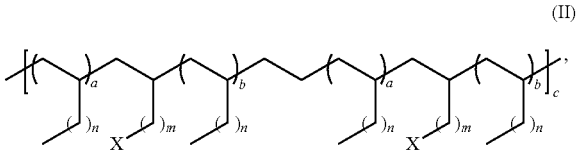

(II)

wherein each of a and b independently is 1, 2, 3, 4, 5, 6, 7, 8, 9, or 10;

c is 1 to 20;

each n is the same and is 0 to 21;

each m is the same and is 0 to 21;

each X independently is —NR$_2$, —NRCH$_2$CH$_2$NR$_2$, —OR, or —COOR; and each R independently is H, C$_{1-6}$alkyl, or aryl.

14. The lubricant composition of claim 10, wherein X is NH$_2$, NHCH$_2$CH$_2$NH$_2$, OH, or COOH.

15. The lubricant composition of claim 13, wherein X is NH$_2$, NHCH$_2$CH$_2$NH$_2$, OH, or COOH.

16. The lubricant composition of claim 1, wherein the metal of the nanoparticles comprises Sc, Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt, Au, or a combination thereof.

17. The lubricant composition of claim 16, wherein the metal comprises Cu, Co, Ni, Au, Pt, Pd, or Ag.

18. A method of lubricating moving, contacting surfaces comprising the step of applying between the contacting surfaces with the lubricant composition of claim 1.

\* \* \* \* \*